US006560319B1

(12) United States Patent
Binder

(10) Patent No.: US 6,560,319 B1
(45) Date of Patent: May 6, 2003

(54) METHOD AND TELEPHONE OUTLET FOR ALLOWING TELEPHONE AND DATA EQUIPMENT TO BE CONNECTED TO A TELEPHONE LINE VIA A COMMON CONNECTOR

(75) Inventor: Yehuda Binder, Hod Hasharon (IL)

(73) Assignee: Serconet Ltd., Ra'anana (IL)

( * ) Notice: Subject to any disclaimer, the term of this patent is extended or adjusted under 35 U.S.C. 154(b) by 265 days.

(21) Appl. No.: 09/764,342

(22) Filed: Jan. 19, 2001

(51) Int. Cl.[7] .............................................. H04M 11/00
(52) U.S. Cl. ................. 379/93.05; 379/90.01; 379/399.01
(58) Field of Search .................... 379/93.05–93.08, 379/90.01, 93.21, 93.28, 93.29, 93.37, 110.01, 399.01, 413.02, 413.04

(56) References Cited

U.S. PATENT DOCUMENTS

| | | | |
|---|---|---|---|
| 4,785,448 A | | 11/1988 | Reichert et al. |
| 5,003,579 A | | 3/1991 | Jones |
| 5,353,334 A | | 10/1994 | O'Sullivan |
| 5,896,443 A | | 4/1999 | Dichter |
| 5,929,896 A | | 7/1999 | Goodman et al. |
| 5,960,066 A | * | 9/1999 | Hartmann et al. ....... 379/93.08 |
| 6,026,150 A | | 2/2000 | Frank et al. |
| 6,069,899 A | | 5/2000 | Foley |
| 6,137,865 A | * | 10/2000 | Ripy et al. ............... 379/93.05 |
| 6,216,160 B1 | * | 4/2001 | Dichter |

FOREIGN PATENT DOCUMENTS

| | | |
|---|---|---|
| WO | 99/03255 | 1/1999 |
| WO | 99/12330 | 3/1999 |

OTHER PUBLICATIONS

"A Multi Drop In–House ADSL Distribution Network", by Chow and Cioffi.
"ADSL Filters", Excelsus.

* cited by examiner

Primary Examiner—Wing Chan
(74) Attorney, Agent, or Firm—Browdy and Neimark, P.L.L.C.

(57) ABSTRACT

A telephone outlet simultaneously supporting both standard telephony and data communications over telephone wiring within a residence or other building. The outlet typically contains a low pass filter, connected between the telephone wiring and the telephone connector pins used for telephony (e.g. pins 2 and 3 in typical North-American RJ-11 connectors). In addition, a direct, unfiltered connection to the telephone wiring is supported via two other unused pins (e.g. pins 1 and 6 in typical North American RJ-11 6-pin connectors), thus allowing the connection of modems and high pass filters for access to the high frequency portion of the spectrum for data communications. Benefits include easy and direct connection of a telephone set or data devices to the same outlet, and elimination of the need to modify the telephone with low-pass filters or to provide an external module with a low-pass filter in series with the telephone. The direct, unfiltered connection to the telephone wiring also permits using a modified telephone having a low-pass filter, or an external module if so desired.

18 Claims, 8 Drawing Sheets

METHOD AND TELEPHONE OUTLET FOR ALLOWING TELEPHONE AND DATA EQUIPMENT TO BE CONNECTED TO A TELEPHONE LINE VIA A COMMON CONNECTOR

FIELD OF THE INVENTION

The present invention relates to the field of wired communication systems, and, more specifically, to the networking of devices over telephone wiring via outlet connections.

BACKGROUND OF THE INVENTION

There is an ongoing trend toward using telephone wiring within a building as media for data communication. As part of the Public Switched Telephone Network (PSTN), telephone wiring is both common and widespread, and is typically configured for the voice spectrum to enable speech communication from one telephone to another. It is well-known in the art that such a system can be used for data communication as well as telephony by employing frequency domain/division multiplexing (FDM) which splits the bandwidth carried by a wire into a low-frequency band capable of carrying an analog telephony signal and a high-frequency band capable of carrying data communication or other signals. Such a mechanism is disclosed, for example, in U.S. Pat. No. 4,785,448 to Reichert et al. Using telephone wiring for both telephony and additional service is disclosed in U.S. Pat. No. 5,929,896 to Goodman et al. Also is common are xDSL systems, primarily Asymmetric Digital Subscriber Loop (ADSL) systems. Recently, there has also been a trend for using telephone wiring for data networking simultaneously with telephony and ADSL signals. Such systems are described, for example, in WO 99/12330 to Foley, U.S. Pat. No. 6,069,899 to Foley, U.S. Pat. No. 5,896,443 to Dichter (hereinafter referred to as "Dichter"), and others. FIG. 1 shows a graph 10 which shows the frequency spectrum for FDM. A POTS signal 11 occupies the 0 to 4 KHz bandwidth, while ADSL signals 12 usually span from 100 KHz to 1.5 MHz, and in-home data network signals 13 (and similar applications) occupy the 5–10 MHz band.

The term "analog telephony" herein denotes traditional analog low-frequency audio voice signals typically under 3 KHz, sometimes referred to as "POTS" ("plain old telephone service"), whereas the term "telephony" in general denotes any kind of telephone service, including digital service such as Integrated Services Digital Network (ISDN). The term "high-frequency" herein denotes any frequency substantially above such analog telephony audio frequencies, such as that used for data. ISDN typically uses frequencies not exceeding 100 KHz (typically the energy is concentrated around 40 KHz). The term "telephone line" herein denotes electrically-conducting lines which are intended primarily for the carrying and distribution of analog telephony, and includes, but is not limited to, such lines which may be pre-existing within a building and which may currently provide analog telephony service. The term "telephone device" herein denotes, without limitation, any apparatus for telephony (including both analog telephony and ISDN), as well as any device using telephony signals, such as fax, voice-modem, and so forth. The term "Data Terminal Equipment" (DTE) herein refers to any device or apparatus which can handle or process data, including, but not limited to, computers and controllers. The term "data communications" herein refers to the sending and/or receiving of data between any devices or apparatus, including, but not limited to, network communications such as a local area network.

FIG. 2 schematically illustrates a prior-art in-home telephone wiring system 20. A junction box (not shown) is used to separate the in-home circuitry from the PSTN and is used as a test facility for troubleshooting as well as for wiring new telephone outlets in the home. A telephone set 26a connects to the telephone wiring, which is usually a wire pair 21a and 21b. Connection is done via a telephone outlet 22, of which there are commonly a number located at convenient places within the home, and which typically utilize a standard RJ-11 ("Registered Jack") connector, which employs either four or six contacts (pins). FIG. 2 illustrates the six-pin RJ-11 form, although the four-pin configuration is also common in North America. Telephone outlet 22 has a female RJ-11 connector 23 (usually referred to as the "jack"). Telephone set 26a may be connected to outlet 22 via a male RJ-11 connector 24 (often referred to as a "plug"). In most cases, the center pins 3 and 4 are used for making the connection. In the four-pin configuration (not shown), the center pins are numbered 2 and 3. The terms "standard connector", "standard telephone connector", and "standard data connector" are used in the description and appended claims to denote any connectors which are industry-standard or de facto standard connectors.

As suggested by the current trends, there is a widespread demand to use existing telephone wiring for both telephony and data networking. In this way, the task of establishing a new local area network in a home or other building is eased, because there are no additional wires to install. As previously noted, frequency domain/division multiplexing provides a means of simultaneously carrying an analog telephony signal and data communication or other signals.

In order to allow for both telephony and data networking without any mutual interference, a set of filters is commonly used. A Low Pass Filter (LPF) is connected in series with the telephone for passing the telephony signal (0–4 KHz band) and isolating the high frequency band. Similarly, a High Pass Filter (HPF) is connected in series with the modem used for the data communication. The term "low pass filter" herein denotes any device that passes signals in the low-frequency (analog telephony) band but blocks signals in the high-frequency (data) band. Conversely, the term "high pass filter" herein denotes any device that passes signals in the high-frequency (data) band but blocks signals in the low-frequency (analog telephony) band. The term "data device" herein denotes any apparatus that handles digital data, including without limitation modems, transceivers, Data Communication Equipment, and Data Terminal Equipment.

FIG. 3 illustrates part of a prior-art network 30. Low pass filters 31a and 31b are connected to telephone sets 26a and 26b respectively. DTE's 34a and 34b intercommunicate via modems 33a and 33b, respectively, which are connected to telephone line pair 21a and 21b via high pass filters 32a and 32b, respectively. Low pass filters such as 31a and 31b are also referred to as "micro-filters".

FIG. 4 shows an example of a prior-art low pass filter 31. Inductors 41a and 41b are placed in series with the connections to pins 3 and 4, respectively, while capacitors 42a and 42b are connected in parallel between pins 3 and 4. LPF 31a is connected in series with telephone set 26a, as shown in FIG. 4. Capacitors 42a and 42b reduce noise produced by telephone 26a in the high-frequency data communication band, and also reduce degradation resulting from the addition of taps in the telephone connection, which are often not terminated properly.

High pass filters 32a and 32b (FIG. 3) are usually included within modems 33a and 32b. Furthermore, both modems 33a and 32b and high pass filters 32a and 32b are usually housed within DTE's 34a and 34b. A typical example of DTE 34a is a personal computer with modem 33a and high pass filter 32a within a plug-in card (known as a "Network Interface Card"—"NIC"), installed in the computer housing. However, since it is not practical to change or modify telephones or telephone wiring, the low pass filter 31 must be an add-on module.

One common prior-art implementation of the low pass filter 31 is as a module having an RJ-11 plug and jack, for being connected externally between telephone set 26a and jack 23 within outlet 22 (FIG. 2). To an ordinary non-technically skilled user, however, the requirement for such a module might present difficulties. A casual user, such as a person in an office or a family member wishing to attach a telephone to an outlet, might not be aware that an additional piece of equipment is required, and thus could unknowingly omit an essential device, thus degrading the data communication performance. In addition, an externally-added plug-in module is vulnerable to being removed, either inadvertently by someone who does not realize the necessity of the device, or by someone who needs, but lacks, such a device for installation elsewhere. Moreover, such an external module is not aesthetic and is relatively expensive, requiring two RJ-11 connectors (plug and jack) and an individual housing in addition to the filter circuitry.

FIG. 5 illustrates a prior art outlet 51 that is adapted for isolating telephony from data communications. Outlet 51 has two RJ-11 telephone jacks 52 and 23. Connector 52 connects directly to the telephone wiring, and hence allows for connection to modem 33 and DTE 34 using high pass filter 32 (FIG. 3). Connector 23 connects to the telephone wiring via low pass filter 31a, which is housed within outlet 51. FIG. 6 shows a schematic diagram of a prior art telephone wiring system 60 employing the outlet 51. Telephone 26a can directly connect to outlet 51 via a plug 24, eliminating the need for any additional hardware or devices. Similarly, modem 33 can directly connect to jack 52 via a high pass filter 32 and a plug 34. This solution does not require any additional modules, but has limitations. Since both connectors 52 and 23 are standard telephone jacks with no visible distinction, the user can easily confuse them and connect telephone 26a to jack 52 or connect modem 33 to jack 23. In either case, the performance of equipment connected to the telephone wiring will be unsatisfactory.

There is thus a widely-recognized need for, and it would be highly advantageous to have, easy-to-use apparatus for connecting ordinary telephone sets and data communication equipment to telephone wiring, so that telephony and data communications can operate simultaneously on the telephone wiring without interfering with each other, and in such a way that requires neither modification to the telephone sets, nor external modules or devices to be used therewith. This goal is met by the present invention.

SUMMARY OF THE INVENTION

The present invention provides apparatus for upgrading an existing telephone line wiring system within a residence or other building, to support both analog telephony service and local data communications in such a manner that a low-frequency band is allocated to regular telephone service (analog telephony), while a high-frequency band is allocated to the data communications. Regular telephone outlets are replaced with outlets according to the present invention, so that a standard telephone device connected to the outlet will be isolated from, and not interfere with, data communications over the telephone wiring.

An outlet according to the present invention contains a telephone connector (such as an RJ-11 connector) and a low pass filter for isolating telephony signals from data signals. The output of the low-pass filter goes to the pair of contacts in the connector which make connection with the pins of a telephone device plugged into the connector (for a 4-wire RJ-11 connector, these are typically pins 2 and 3, while for a 6-wire RJ-11 connector these are typically pins 3 and 4). The input to the low-pass filter is connected to a pair of contacts in the connector which is not normally used for a single-line telephone device (for a 4-wire RJ-11 connector, these are typically pins 1 and 4, while for a 6-wire RJ-11 connector these are typically pins 1 and 6). When the outlet is installed, the input to the low-pass filter is connected to the telephone wiring via a suitable attachment means, such as screw contacts or other system. With this connection in effect, the telephone wiring will be directly connected to the normally-unused contacts of the outlet's telephone connector, and the telephone wiring will be connected through the low-pass filter to the connector's contacts which provide standard telephony connection. This arrangement automatically isolates a plugged-in telephone device from any data communication taking place over the telephone wiring. At the same time, however, a data communication device can access the telephone wiring directly by connecting to the outlet via the contacts in the connector which are not used for telephony, thereby bypassing the low-pass filter. Such a data device will normally have a modem with a built-in high-pass filter, as previously noted. In this fashion, an outlet according to the present invention can serve both telephony and data communications.

Data Terminal Equipment as well as telephone devices can be readily connected to the outlets, thereby allowing a data communications network as well as a telephone system to be easily configured, such that both the data communications network and the telephone system can operate simultaneously without interference between one another.

It is to be noted that historically telephone connectors of the RJ-11 type have been provided with more contacts than are required in use. Thus, as noted above, 4-wire RJ-11 connectors typically utilize only pins 2 and 3, while 6-wire RJ-11 connectors typically utilize only pins 3 and 4. In either case, there is at least one spare pair of pins that is simply unused in the prior art and, so far as is known to the present applicant, no use has been suggested to use these pins. Certainly, it has not been proposed to exploit the redundancy of the spare pair of contacts for allowing both a telephone device and data equipment to be connected to the same outlet, each via respective pairs of contacts.

Accordingly, there is provided in accordance with a broad aspect of the invention a method for using a standard telephone outlet containing a connector having at least two first contacts intended for connecting a telephone device thereto and having at least two normally unused second contacts so as to allow said outlet to support both telephony and data communication over telephone wiring, the method comprising the steps of:

(a) using the second contacts to effect electrical connection to the telephone wiring, (b) allowing data equipment to be connected to the outlet via a complementary connector having contacts for engaging the second contacts of the connector, and (c) providing discrimination circuitry within the outlet for allowing distinct connection of the first and second contacts to the telephone wiring.

In accordance with the invention, a telephone outlet for supporting both telephony and data communication over telephone wiring comprises:

a telephone connector operative to connecting a telephone device having at least two connections, said telephone connector having at least two first contacts operative to establishing an electrical connection with said connections and at least two second normally unused contacts electrically distinct from said first contacts, terminals coupled to the first contacts and to the second contacts for connecting the telephone wiring thereto, and discrimination circuitry allowing for distinct connection of the first and second contacts to the telephone wiring.

A telephone device having an integral low pass filter may be connected to the first contacts so as not to receive interfering data, which having a high frequency is blocked by the low pass filter. Alternatively, a low pass filter may be integrally connected to the first contacts within the outlet.

BRIEF DESCRIPTION OF THE DRAWINGS

The invention is herein described, by way of example only, with reference to the accompanying drawings, wherein.

DETAILED DESCRIPTION OF THE INVENTION

Figure 1:
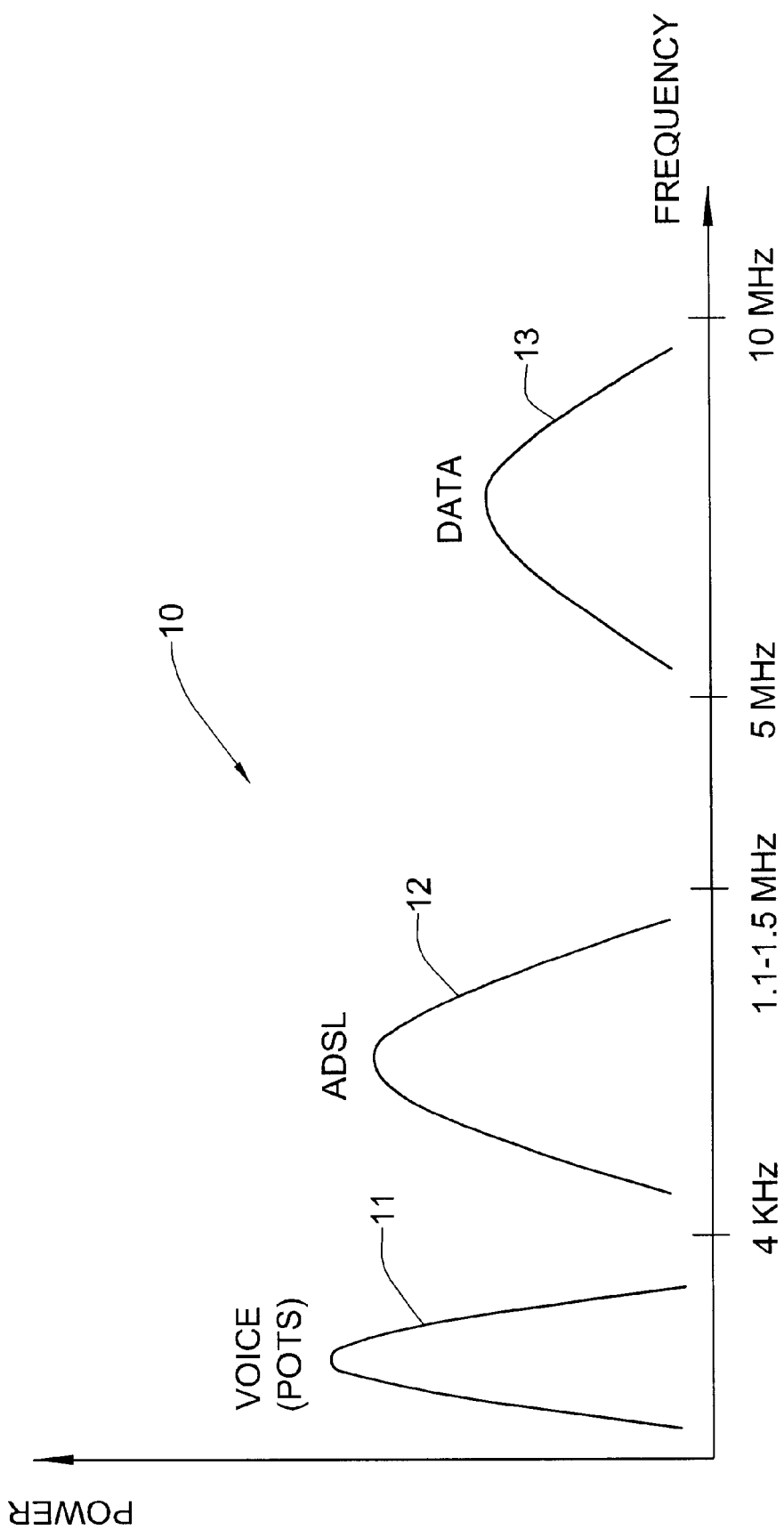
FIG. 1 shows the prior-art frequency spectrum of multiple services over the telephone wiring.
Figure 2:
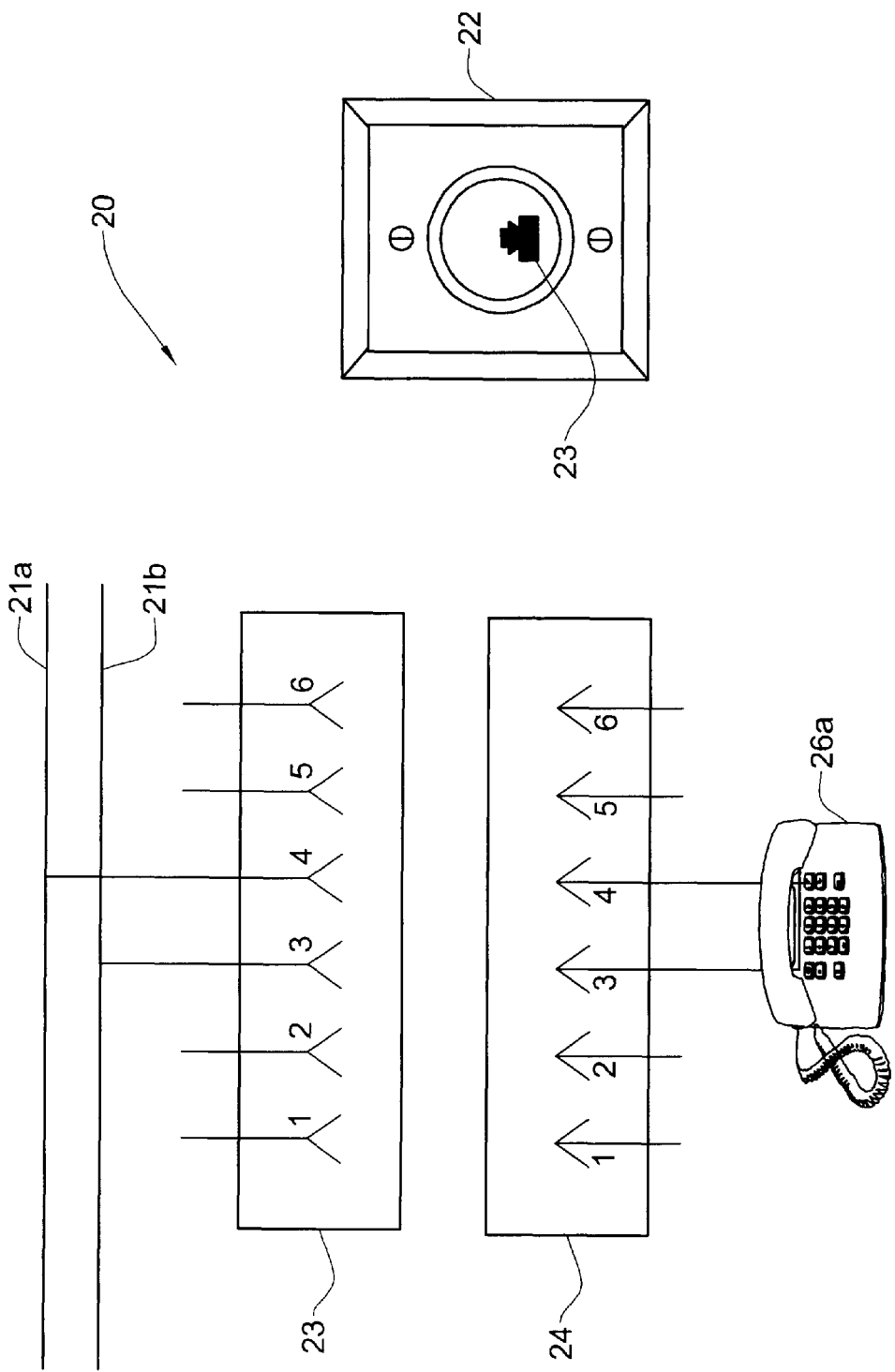
FIG. 2 shows part of a prior-art telephone wiring system for a residence or other building.
Figure 3:
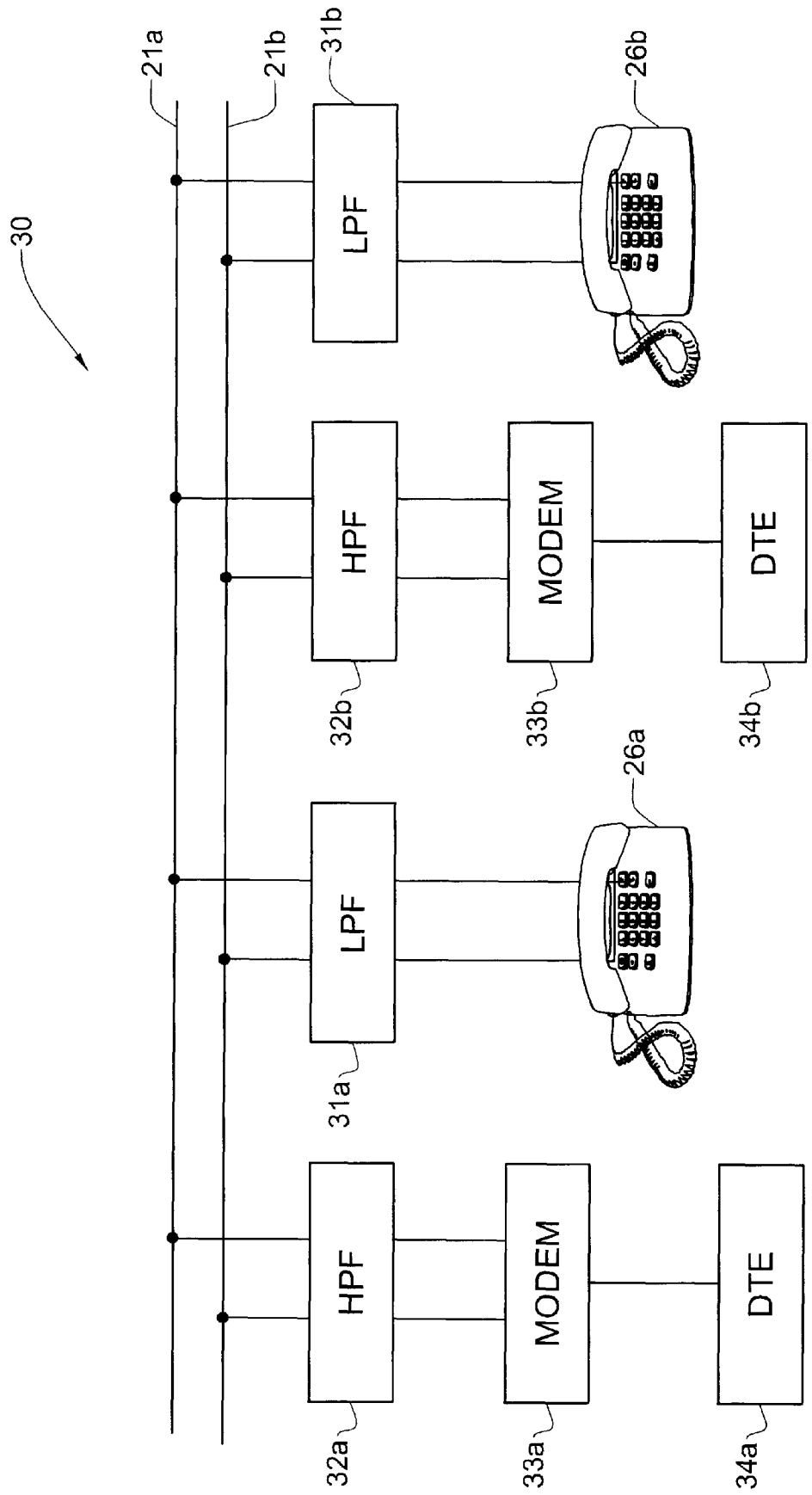
FIG. 3 shows a prior art telephone line communication system for both telephony and data communications.
Figure 4:
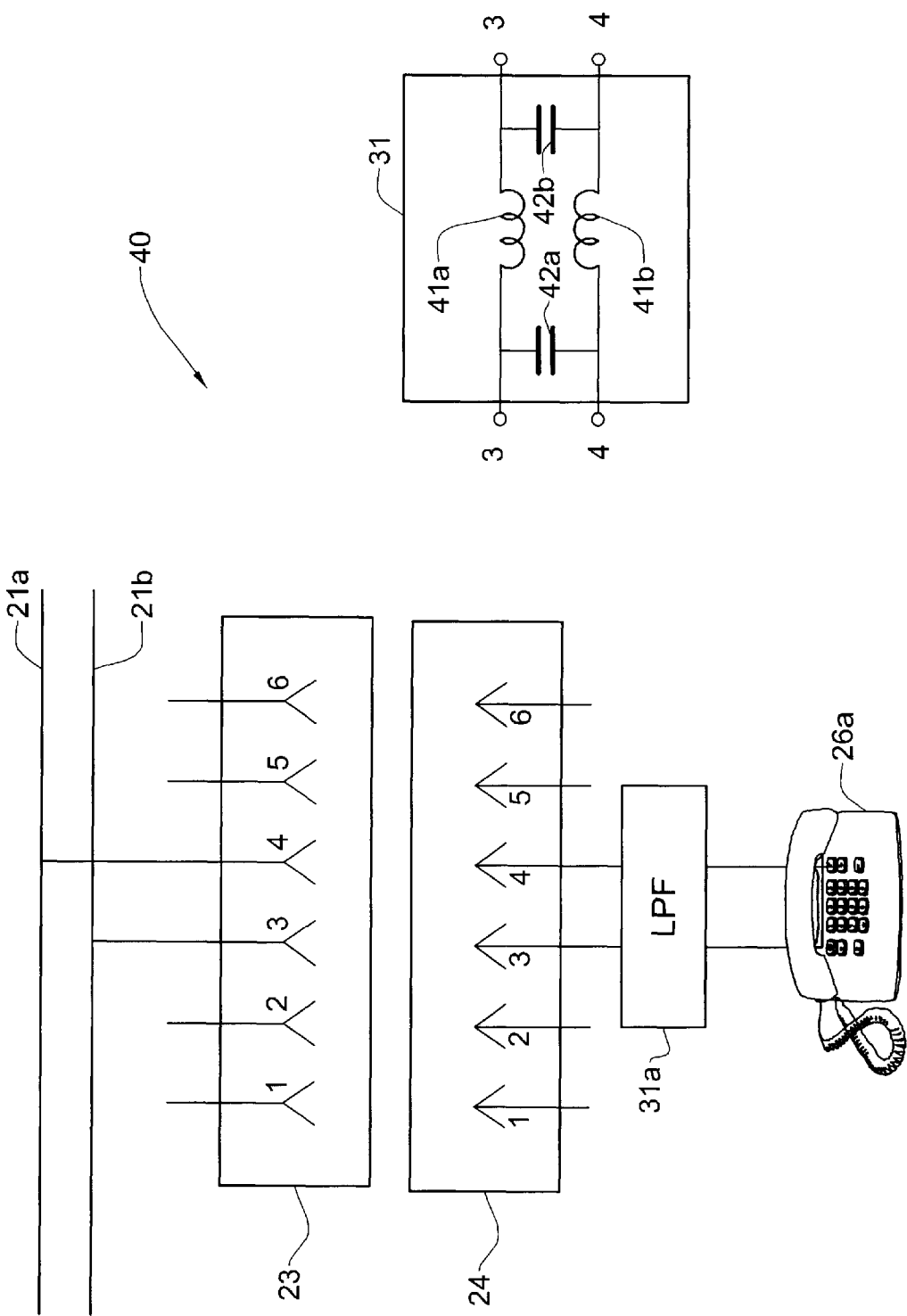
FIG. 4 shows prior art modifications for telephone wiring connections required for isolating the telephony from data communications.

The principles and operation of a network according to the present invention may be understood with reference to the drawings and the accompanying description. The drawings and descriptions are conceptual only. In actual practice, a single component can implement one or more functions; alternatively, each function can be implemented by a plurality of components and circuits. In the drawings and descriptions, identical reference numerals are used to indicate those components, which are common to different embodiments or configurations.

Figure 7:
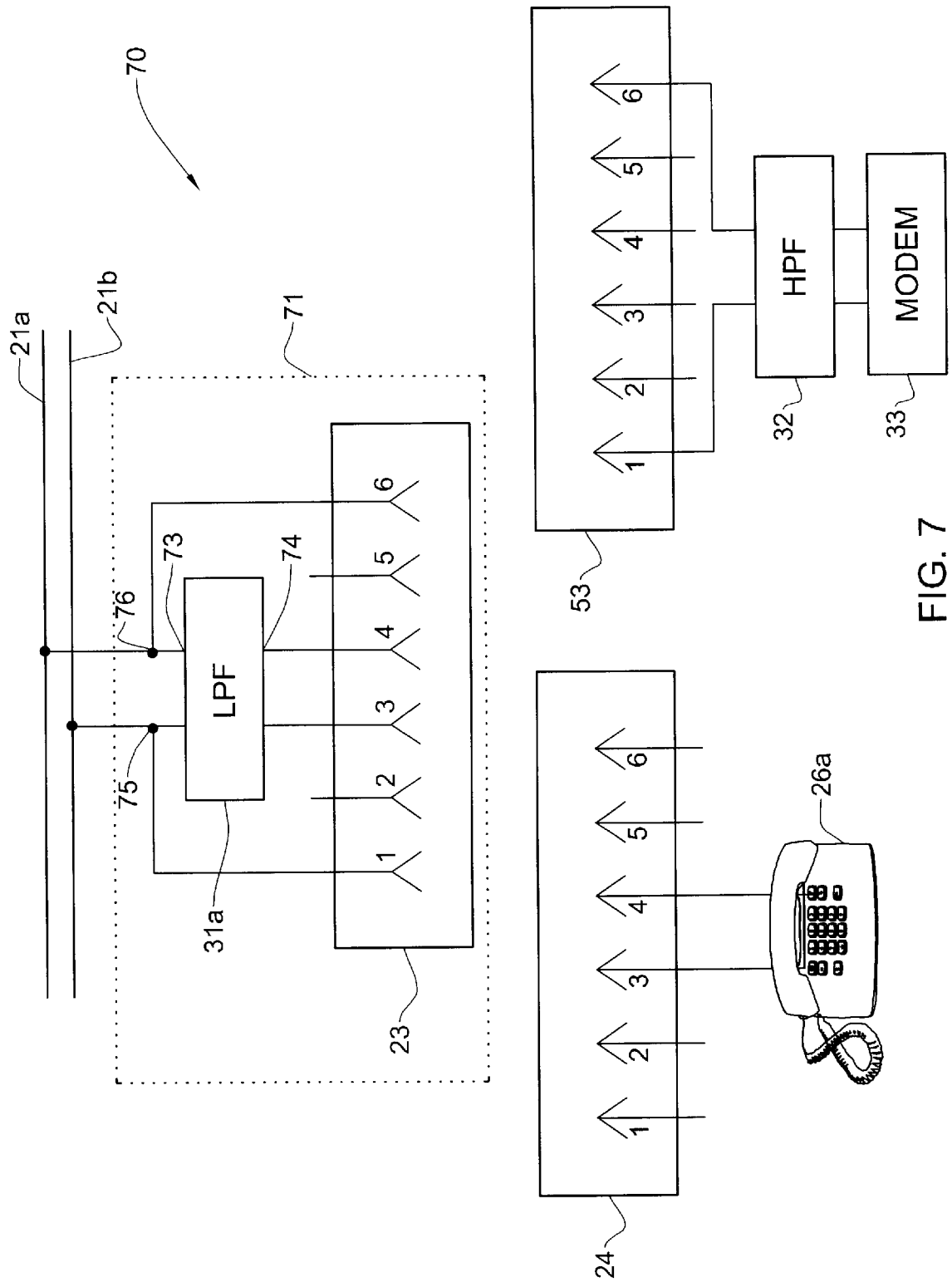
FIG. 7 shows an outlet configuration and part of the modified telephone wiring according to a first embodiment of the present invention.

FIG. 7 illustrates a system 70 employing an outlet 71 according to a first embodiment the present invention. Such an outlet has a standard telephone jack 23 (such as an RJ-11). The contacts in telephone jack 23 which are used for standard telephone connection are connected to telephone wiring 21a and 21b via the low pass filter 31a having an input 73 and an output 74. As noted previously, for 4-pin RJ-11 connectors these contacts (constituting first contacts) are typically pins 2 and 3, while for 6-pin RJ-11 connectors these are typically pins 3 and 4, as illustrated in FIG. 7. The first pair of contacts is connected inside the outlet 71 to the output 74 of the low pass filter 31a, while the input 73 of the low pass filter 31a is connected to a second pair of normally unused contacts in the telephone jack 23 (constituting second contacts). As noted previously, for 4-pin RJ-11 connectors, these could be pins 1 and 4, while for 6-pin RJ-11 connectors these could be pins 1 and 6, as illustrated in FIG. 7. The input 73 of the low pass filter 31a is also connected to screw terminals 75 and 76, which allow for direct non-filtered connection of the outlet 71 to the telephone wiring 21a and 21b. Thus, a plug 24 for telephone set 26a can be plugged directly into the outlet 71 via the first pair of contacts, without any need to modify the telephone set or to use any additional module. Moreover, the telephone wiring can be accessed for data communications by connecting DTE (not shown) to the telephone wiring via modem 33 and high pass filter 32, connected to the second pair of contacts in the outlet 71 via the appropriate pins of a telephone plug 53 (illustrated in FIG. 7 for a 6-pin RJ-11 utilizing pins 1 and 6).

Figure 5:
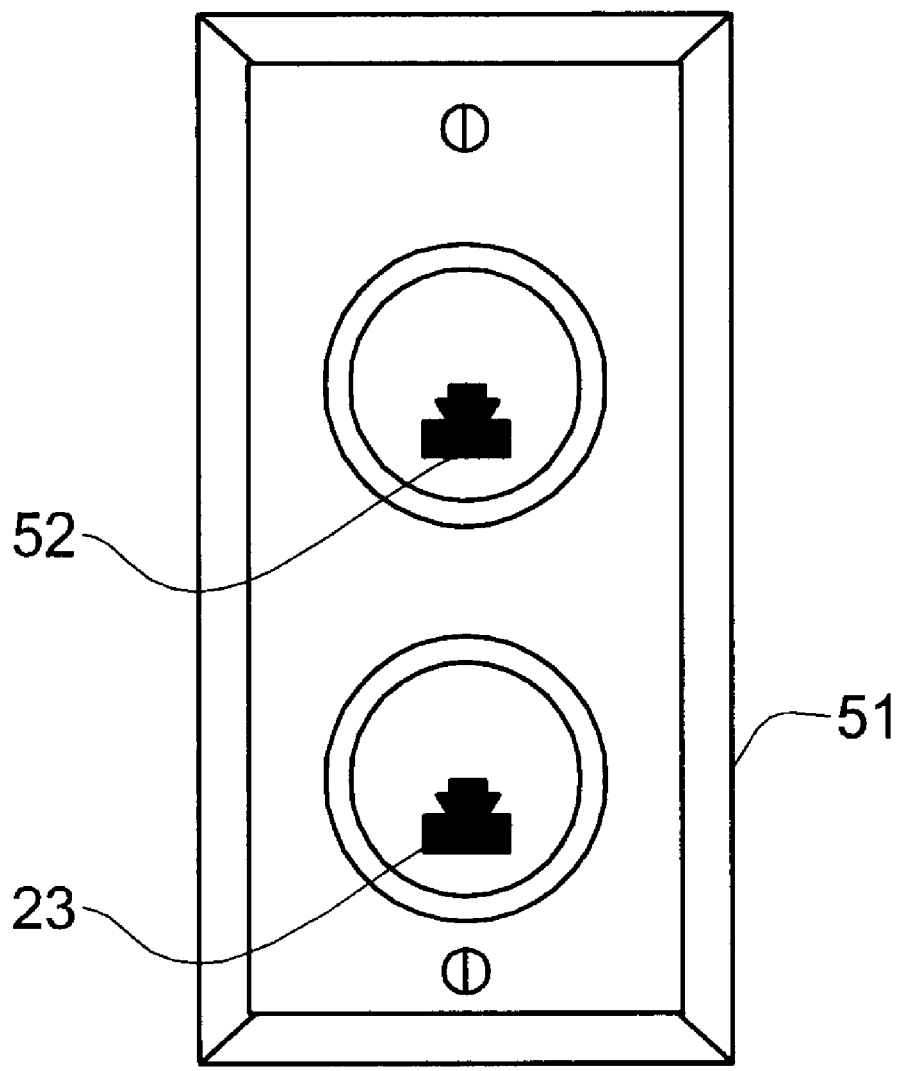
FIG. 5 shows a prior art telephone outlet supporting both telephony and data communications.
Figure 6:
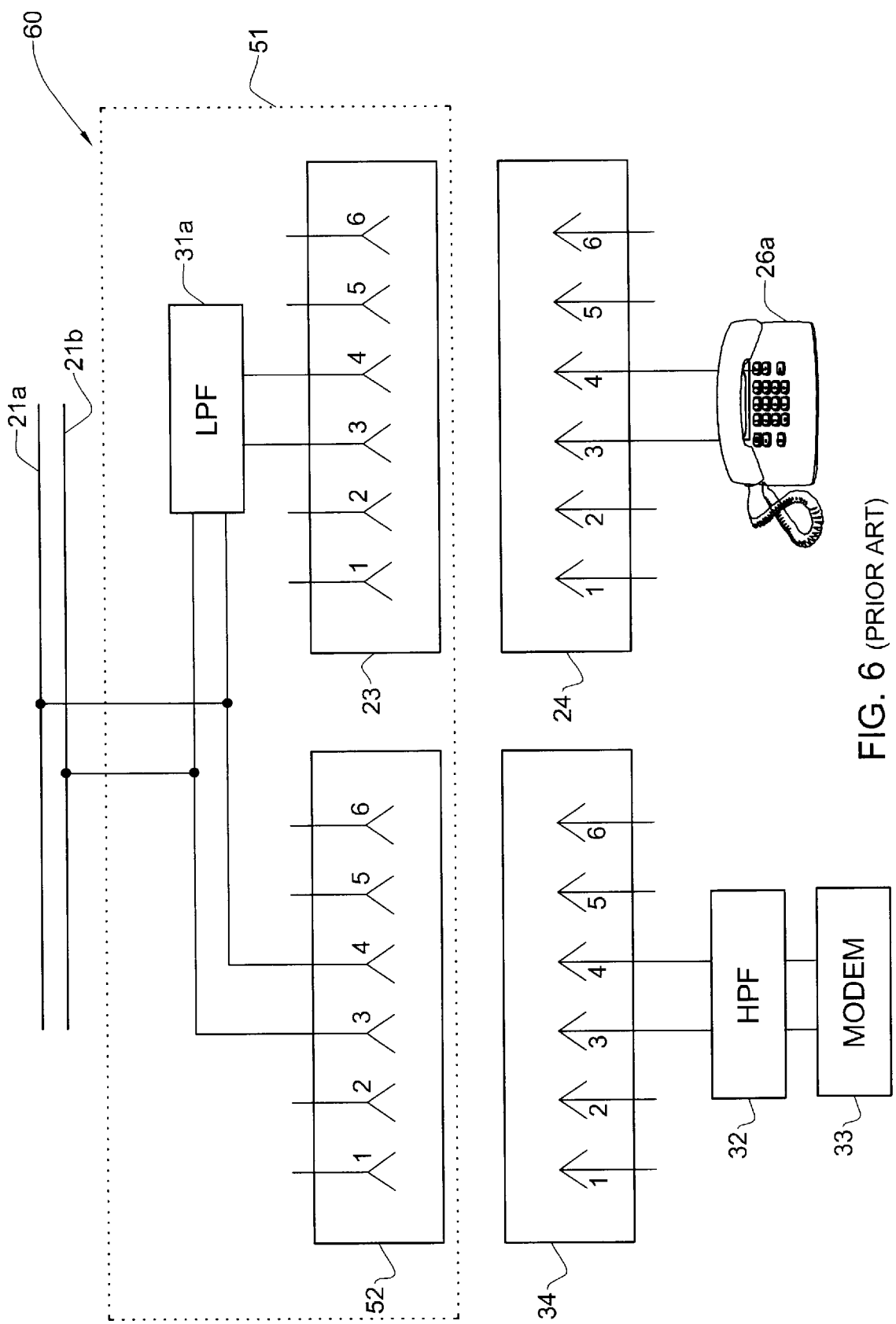
FIG. 6 shows prior art telephone wiring supporting both telephony and data communications.

An outlet according to the present invention is physically similar in size, shape, and appearance to a standard telephone outlet having a single connection, and can be substituted for a standard telephone outlet in the building wall. This takes up much less room and is less expensive than the modified outlet 51 having a double connection as shown in FIG. 5 and allows for faster, and therefore less expensive, installation. No changes are required in the overall telephone wiring layout or configuration.

Figure 8:
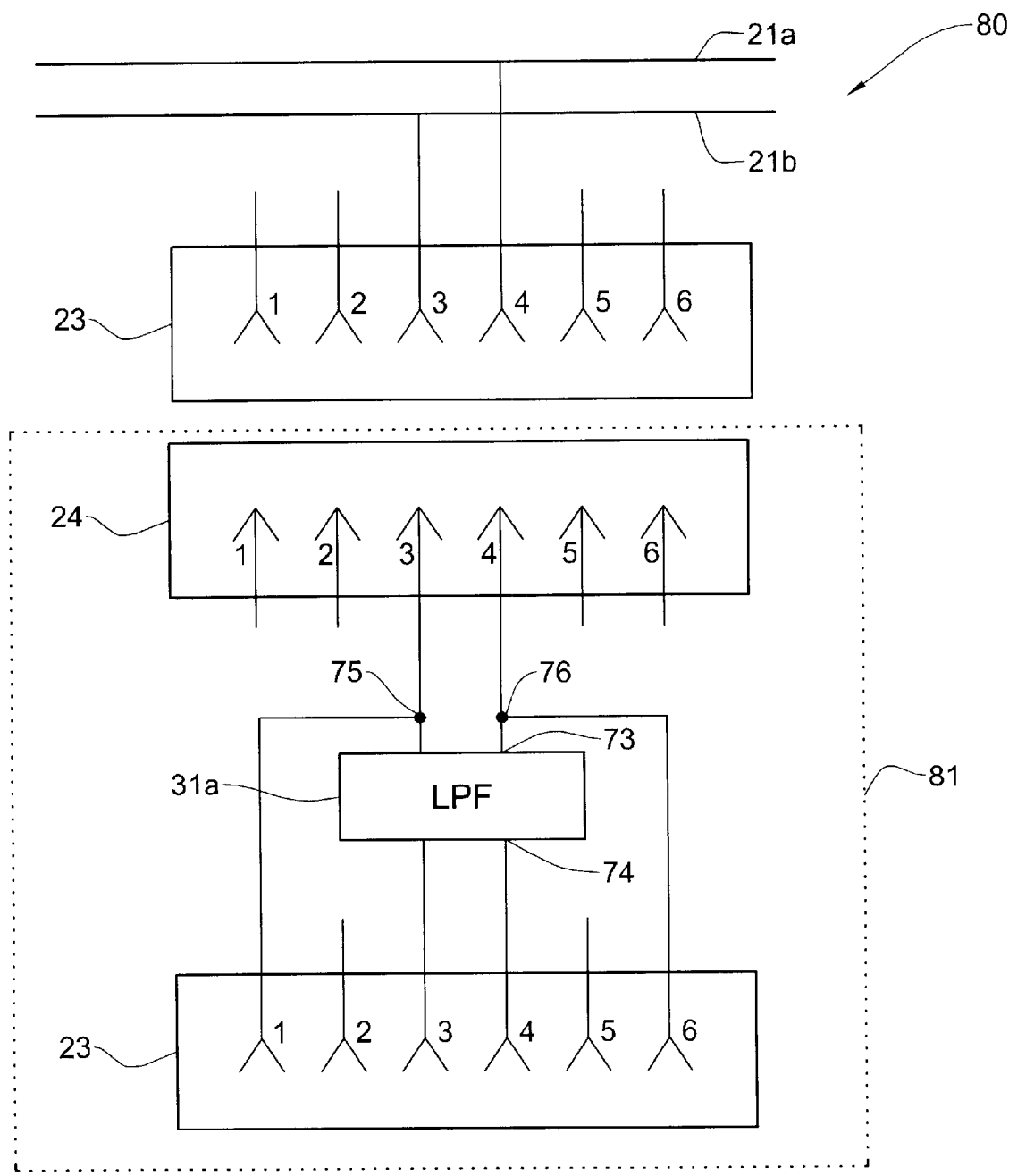
FIG. 8 shows an add-on module configuration and part of the modified telephone wiring according to a second embodiment of the present invention.

In a second embodiment of the present invention, an external add-on module may be inserted between a standard telephone set and a standard telephone outlet. FIG. 8 illustrates a module 81 connected to a system 80. Such a module 81 has a standard telephone plug 24 and a standard telephone jack 23, such that plug 24 is able to plug into outlet jack 23. A telephone set or a data device can be plugged into jack 23 of module 81. The principles of operation are the same for module 81 as for outlet 71, as previously detailed.

Thus, the module 81 includes a first connector 23 having a first pair of contacts 3 and 4 (constituting first contacts) operative to establishing an electrical connection with complementary connectors of a telephone device and having a second pair of contacts 1 and 6 (constituting second contacts) electrically distinct from said first pair of contacts. A low-pass filter 31a has an input 73 directly connected to the second pair of contacts 1, 6 and an output 74 connected to the first pair of contacts 3, 4, and a second connector 24 operative to connecting the telephone wiring 21a, 21b to the input 73 of the low-pass filter 31a.

The present invention has been described in terms of media having a single pair of wires, but is also applicable to more conductors. For example, ISDN employs two pairs for communication. In a similar manner, a low pass filter can be used for each such pair, and the connector changed to an ISDN connector (RJ-45).

While the invention has been described with respect to a limited number of embodiments, it will be appreciated that many variations, modifications and other applications of the invention may be made.

For example, the low pass filter has been shown connected within the outlet to accommodate those situations (currently the norm) where a telephone device does not itself have an integral low pass filter. In like manner, the high pass filter may be connected within the outlet, thus obviating the need for this to be connected externally. As is known, the high pass filter is normally integral with the modem and, in such case, the combined modem and high pass filter may be connected in the outlet.

The invention has been described with particular regard to connection of either a telephone device or data equipment to an outlet having only one RJ-11 type connector. However, it will readily be appreciated that both a telephone device and data equipment may be connected to the outlet simultaneously via a complementary connector having respective pairs of pins connected to the telephone device and data equipment via corresponding cables.

Likewise, it is to be noted that whilst complementary connectors in the form of RJ-11 plugs having multiple pins are known, and include at least one pair of spare contacts, it has not been hitherto proposed to utilize the spare of contacts for connecting to data equipment. The invention thus encompasses within its scope such a connector.

Finally, whilst the invention has been described with particular reference to the use of RJ-11 type connectors, this has been done only because such connectors are prevalent and have become the industry standard. However, it is to be noted that use of RJ-11 connectors is not an essential feature of the invention, which will find application with other kinds of connector.

What is claimed is:

1. A method for using a standard telephone outlet containing a connector having at least two first contacts intended for connecting a telephone device thereto and having at least two normally unused second contacts so as to allow said outlet to support both telephony and data communication over telephone wiring comprising at least two conductors, the method comprising the steps of:

(a) using the second contacts to effect electrical connection to the telephone wiring, (b) allowing data equipment to be connected to the outlet via a complementary connector having contacts for engaging the second contacts of the connector, and (c) providing discrimination circuitry within the outlet for allowing distinct connection of the first and second contacts to the telephone wiring.

2. The method according to claim 1, wherein step (c) includes:

i) connecting a low pass filter between the first contacts and the telephone wiring.

3. The method according to claim 1, further including:

(d) connecting a first conductor pair to the first contacts for connecting to the telephone device, and (e) connecting a second conductor pair to the second contacts for connecting to the data equipment;

thereby allowing both the telephone device and the data equipment to be connected to the telephone outlet simultaneously.

4. The method according to claim 2, further including:

(f) connecting a first conductor pair to the first contacts for connecting to the telephone device, and (g) connecting a second conductor pair to the second contacts for connecting to the data equipment;

thereby allowing both the telephone device and the data equipment to be connected to the telephone outlet simultaneously.

5. A telephone outlet for supporting both telephony and data communication over telephone wiring comprising at least two conductors, the telephone outlet comprising:

a telephone connector operative to connecting a telephone device having at least two connections, said telephone connector having at least two first contacts operative to establishing an electrical connection with said connections and at least two normally unused second contacts electrically distinct from said first contacts, terminals coupled to the first contacts and to the second contacts for connecting the telephone wiring thereto, and discrimination circuitry allowing for distinct connection of the first and second contacts to the telephone wiring.

6. The outlet according to claim 5, wherein the discrimination circuitry includes:

a low-pass filter having an input and an output, said output being connected to said first contacts, and said input being directly connected to said second contacts.

7. The outlet according to claim 6, wherein said low-pass filter is operative to isolate telephony service.

8. The outlet according to claim 5, wherein said connector is compatible with the RJ-11 standard.

9. The outlet according to claim 6, wherein said connector is compatible with the RJ-11 standard.

10. The outlet according to claim 7, wherein said connector is compatible with the RJ-11 standard.

11. A connector for connecting data equipment to the outlet of claim 5, said connector being complementary to the connector in said outlet and having a pair of connectors for connecting to the second contacts of the connector.

12. The connector according to claim 11 being compatible with the RJ-11 standard.

13. A module for supporting both telephony and data communication over telephone wiring, the module comprising:

a first connector having at least two first contacts operative to establishing an electrical connection with complementary connectors of a telephone device and having at least two second contacts electrically distinct from said first contacts;

a low-pass filter having an input and an output, said output being connected to said first contacts, and said input being directly connected to said second contacts; and a second connector operative to connecting the telephone wiring to the input of the low-pass filter.

14. The module according to claim 13, wherein said low-pass filter is operative to isolate telephony service.

15. The module according to claim 13, wherein said first connector is compatible with the RJ-11 standard.

16. The module according to claim 14, wherein said first connector is compatible with the RJ-11 standard.

17. The module according to claim 13, wherein said second connector is compatible with the RJ-11 standard.

18. The module according to claim 13, wherein said second connector is compatible with the RJ-11 standard.

* * * * *